(Model.)

J. MOSSMAN.
GATE LATCH.

No. 257,968. Patented May 16, 1882.

Witnesses:
P. B. Turpin.
F. W. Wheat

Inventor:
James Mossman
By R. S. & A. P. Lacey
Attys.

UNITED STATES PATENT OFFICE.

JAMES MOSSMAN, OF WESTERVILLE, OHIO.

GATE-LATCH.

SPECIFICATION forming part of Letters Patent No. 257,968, dated May 16, 1882.

Application filed March 31, 1882. (Model.)

*To all whom it may concern:*

Be it known that I, JAMES MOSSMAN, a citizen of the United States, residing at Westerville, in the county of Franklin and State of Ohio, have invented certain new and useful Improvements in Gate and Barn-Door Latches, of which the following is a specification, reference being had therein to the accompanying drawings.

My invention relates to improvements in gate and barn-door latches, and has for its object to furnish a latch that will be self-acting and will not be affected by the sagging of the gate or door.

It consists in the combination, with a tubular casing provided with face-plate having stops thereon, of a latch having its shank held within the casing and its wing arranged to drop out in front of and secure the door or gate, its motion being limited by the stops on the face-plate, as will be hereinafter fully described, and pointed out in the claim.

Figure 1:
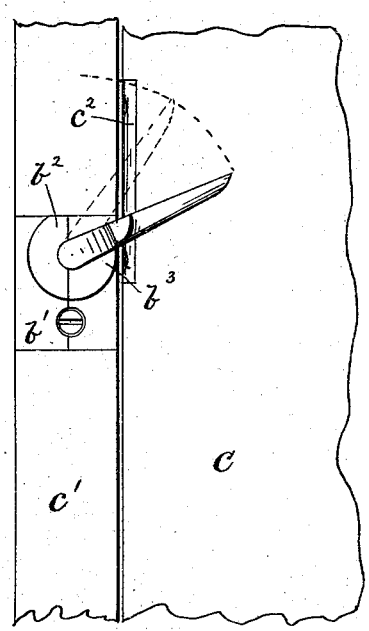
Figure 3:
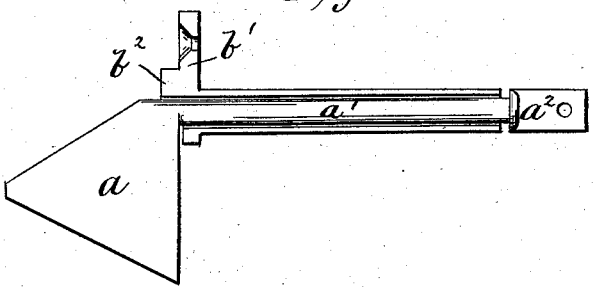
Figure 4:
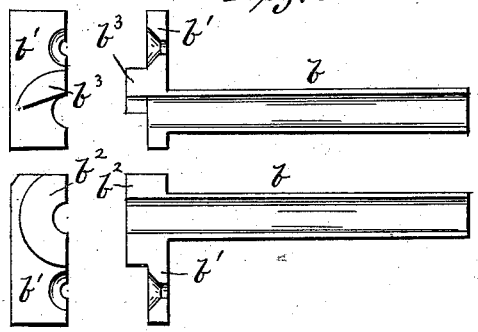
Figure 2:
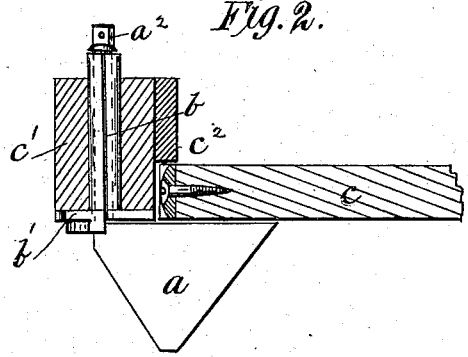
Figure 5:
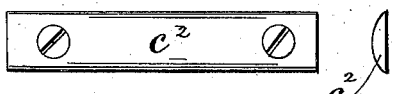

In the drawings, Figure 1 is a front elevation, and Fig. 2 is a cross-section, showing my invention applied to a door or gate; and in Figs. 3, 4, and 5 I show detail views of the parts hereinafter described.

My latch is composed of the wing $a$, the shank or shaft $a'$, and the ferrule $a^2$. When I construct the tubular casing, hereinafter described, in two pieces, I form this ferrule as part of my shank; but when the tube is made in one piece it is necessary to secure the ferrule to the shank after the latter has been placed through the tubular casing. This may be done by screw-thread or in any other manner desired. The office of this ferrule is to prevent the shank from being pulled through the tubular casing, and it is consequently arranged on the shank at a distance from the wing $a$ equal to the length of the tubular casing, hereinafter described. The wing $a$ is beveled or rounded on its under side, so as to be readily acted on by contact of the edge of door or gate therewith, as will be described; and the said wing is arranged in position to fall beyond the gate-post, over the opening for the gate, and into position to be engaged by the edge of the same, as shown.

$b$ is the tubular casing, which I have preferably shown in two sections. It will be understood, however, that the said casing could be formed a solid tube and the shank of the latch secured thereon, as hereinbefore described. On the outer side of this casing I form the face-plate $b'$, which I seat in a suitable mortise on face of gate or door post, with its outer surface flush with the face of said post, as shown.

$b^2$ $b^3$ are stops fixed on the face-plate adjacent to the opening through the tubular casing. These stops are arranged to limit the motion of the wing, the stop $b^2$ being placed flush with the side of the opening through the tubular casing opposite the gate-opening, and so arranged as to prevent the said wing from attaining quite a vertical position, so it will always drop of its own weight, and thus be self-acting; and the stop $b^3$ is placed flush with the under side of the opening through the tubular casing, and is extended toward the gate-opening and inclined upward in that direction, thus holding the wing slightly above a horizontal position, so it may be readily pressed upward by the edge of the gate being pressed against it, as indicated in dotted lines, Fig. 1.

$c$ represents the door or gate, and $c'$ the door or gate post. $c^2$ represents a metallic plate secured to the edge of gate-post in position to engage the beveled edge of wing $a$. This plate $c^2$ prevents wear on the edge of the gate and secures a readier action of wing $a$.

Great inconvenience is experienced from gates and barn-doors sagging and thus rendering their latches inoperative, and it is to overcome this disadvantage and to render my latch self-acting that I construct my latch as described.

In the operation of my invention I form a suitable mortise through the gate-post and place the tubular casing $b$, with the shank $a'$, in the said mortise, the wing $a$ being placed between the stops $b^2$ $b^3$. I secure the device in position by screws passed through suitable holes in the face-plate $b'$ into the post. The wing will then drop of its own weight to the position shown in full lines, Fig 1. Then, if the wing be lifted and the gate $c$ be opened, it will, on being pressed in against the latch, force the same up against the stop $b^2$, and the gate will be pressed past it, and the wing will again drop to the position shown in full lines.

If desired, a knob could be fixed to the ferrule $a^2$. I simply cut a hole through it and place a pin in it, so the wing may be lifted and the gate opened from the inside.

These latches may be made right or left, so as to be applicable to doors swung either way.

I am aware that Patent No. 119,552 was granted October 3, 1871, to J. H. Allison, in which is shown a wing-latch on the face of the post and arranged to be engaged by and drop automatically over a latch-bar fixed to and projecting horizontally beyond the edge of the gate and over the face of the said post; and I do not claim such as my invention.

Having thus described my invention, what I claim, and desire to secure by Letters Patent, is—

In a gate-latch, the combination, with the tubular casing provided with a face-plate and having stops arranged thereon adjacent to the tubular opening to limit the movement of the wing of the latch, of the latch having its shank held in the tubular casing and its wing arranged to rest on the stop $b^3$ and project beyond the edge of the post in position to be engaged and lifted by the gate in the act of closing, substantially as set forth.

In testimony whereof I affix my signature in presence of two witnesses.

JAMES MOSSMAN.

Witnesses:
JEREMIAH DITCH,
J. F. CLYMER.